US011943551B2

United States Patent
Yang

(10) Patent No.: US 11,943,551 B2
(45) Date of Patent: Mar. 26, 2024

(54) DEPTH-SENSING DEVICE AND RELATED ELECTRONIC DEVICE AND METHOD FOR OPERATING DEPTH-SENSING DEVICE

(71) Applicant: SHENZHEN GOODIX TECHNOLOGY CO., LTD., Guangdong (CN)

(72) Inventor: Meng-Ta Yang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 395 days.

(21) Appl. No.: 17/409,671

(22) Filed: Aug. 23, 2021

(65) Prior Publication Data

US 2021/0392284 A1 Dec. 16, 2021

Related U.S. Application Data

(63) Continuation of application No. PCT/CN2020/095719, filed on Jun. 12, 2020.

(51) Int. Cl.
*H04N 25/705* (2023.01)
*G01B 11/22* (2006.01)
(Continued)

(52) U.S. Cl.
CPC ........... *H04N 25/705* (2023.01); *G01B 11/22* (2013.01); *G01S 7/4816* (2013.01); *G01S 7/497* (2013.01); *G01S 17/894* (2020.01)

(58) Field of Classification Search
CPC .... H04N 25/705; H04N 25/709; G01B 11/22; G01S 7/4816; G01S 7/497; G01S 17/894
See application file for complete search history.

(56) References Cited

U.S. PATENT DOCUMENTS 9,196,067 B1 * 11/2015 Freed ................. G01S 17/66
10,187,591 B2 * 1/2019 Matsuo ................ H04N 25/131
(Continued)

FOREIGN PATENT DOCUMENTS

| CN | 1976387 A | 6/2007 |
| CN | 106067954 A | 11/2016 |

(Continued)

OTHER PUBLICATIONS

English Abstract of KR20190014977A.
(Continued)

*Primary Examiner* — Timothy R Newlin
(74) *Attorney, Agent, or Firm* — WPAT, P.C.; Anthony King

(57) ABSTRACT

Disclosed herein are a depth-sensing device and a related electronic device and method for operating the depth-sensing device. The depth-sensing device includes: an image sensor, which includes a pixel array, configured to sense a reflected light signal reflected from a target to the pixel array, wherein reflected light signal forms a plurality of light speckles on the pixel array, and the pixel array includes a plurality of first-type pixels and a plurality of second-type pixels, wherein the first-type pixel are distributed in a first set of pixel rows of the pixel array, the second-type pixels are distributed in a second set of pixel rows of the pixel array, and the pixel rows extend toward a first predetermined direction.

15 Claims, 5 Drawing Sheets

(51) Int. Cl.
  *G01S 7/481* (2006.01)
  *G01S 7/497* (2006.01)
  *G01S 17/894* (2020.01)

(56) References Cited

U.S. PATENT DOCUMENTS

| | | | | |
|---|---|---|---|---|
| 10,324,171 | B2* | 6/2019 | Niclass | G01S 17/10 |
| 11,108,957 | B1* | 8/2021 | Oh | H04N 25/42 |
| 2005/0285966 | A1* | 12/2005 | Bamji | G01C 3/08 |
| | | | | 348/E9.005 |
| 2012/0038903 | A1* | 2/2012 | Weimer | G01C 3/08 |
| | | | | 250/208.2 |
| 2012/0062705 | A1* | 3/2012 | Ovsiannikov | G01S 7/4915 |
| | | | | 348/46 |
| 2012/0281206 | A1* | 11/2012 | Ko | G01J 1/4228 |
| | | | | 356/218 |
| 2015/0285625 | A1 | 10/2015 | Deane | |
| 2016/0178749 | A1* | 6/2016 | Lin | H04N 25/75 |
| | | | | 348/302 |
| 2016/0182895 | A1* | 6/2016 | Ko | G01S 17/894 |
| | | | | 348/46 |
| 2016/0373722 | A1* | 12/2016 | Mishra | H04N 1/32309 |
| 2017/0176579 | A1* | 6/2017 | Niclass | G01S 17/10 |
| 2017/0195589 | A1* | 7/2017 | Kovacovsky | G06T 7/80 |
| 2018/0367767 | A1* | 12/2018 | MacKinnon | H04N 7/015 |
| 2019/0137609 | A1* | 5/2019 | Roy | H01L 27/14612 |
| 2019/0285751 | A1* | 9/2019 | Hall | H04N 13/344 |
| 2020/0103507 | A1* | 4/2020 | Kirillov | G01S 17/42 |
| 2020/0264287 | A1* | 8/2020 | Graefling | G01S 17/42 |
| 2020/0309917 | A1* | 10/2020 | Kudla | G01S 17/04 |
| 2021/0173057 | A1* | 6/2021 | Wei | G01S 7/4815 |
| 2021/0223371 | A1* | 7/2021 | Meynants | G01S 17/42 |
| 2021/0392283 | A1* | 12/2021 | Agranov | H04N 25/53 |
| 2023/0007175 | A1* | 1/2023 | Ovsiannikov | G06T 7/521 |
| 2023/0296743 | A1* | 9/2023 | Han | G01S 17/931 |
| | | | | 356/5.01 |

FOREIGN PATENT DOCUMENTS

| | | |
|---|---|---|
| CN | 106067968 A | 11/2016 |
| CN | 106952309 A | 7/2017 |
| CN | 108027239 A | 5/2018 |
| CN | 108886592 A | 11/2018 |
| CN | 109427086 A | 3/2019 |
| CN | 109951625 A | 6/2019 |
| CN | 110024374 A | 7/2019 |
| CN | 110687541 A | 1/2020 |
| CN | 110779459 A | 2/2020 |
| CN | 111095914 A | 5/2020 |
| CN | 111142088 A | 5/2020 |
| CN | 111263899 A | 6/2020 |
| DE | 102018121454 A1 | 3/2020 |
| JP | 2004023747 A | 1/2004 |
| KR | 20190014977 A | 2/2019 |
| WO | 2020115017 A1 | 6/2020 |

OTHER PUBLICATIONS

English Abstract of JP2004023747A.
English Abstract of DE102018121454A1.
English Abstract of CN111263899A.
English Abstract of CN111142088A.
English Abstract of CN111095914A.
English Abstract of CN110779459A.
English Abstract of CN110687541A.
English Abstract of CN110024374A.
English Abstract of CN109951625A.
English Abstract of CN109427086A.
English Abstract of CN108886592A.
English Abstract of CN108027239A.
English Abstract of CN106952309A.
English Abstract of CN106067968A.
English Abstract of CN106067954A.
English Abstract of CN1976387A.
As-filed PCT Request of PCT/CN2020/095719.
As-filed PCT Application of PCT/CN2020/095719.
International Searching Authority (ISA) Form 202—Notification of Receipt of PCT/CN2020/095719.
International Searching Authority (ISA) Form 210—International Search Report of PCT/CN2020/095719.
International Searching Authority (ISA) Form 220—Notification of Transmittal of the International Search Report and the Written Opinion of the International Searching Authority, or the Declaration of PCT/CN2020/095719.
International Searching Authority (ISA) Form 237—Written Opinion of PCT/CN2020/095719.
Notification of the International Application number and of the International Filing Date—Form 105 of PCT/CN2020/095719.

* cited by examiner

DEPTH-SENSING DEVICE AND RELATED ELECTRONIC DEVICE AND METHOD FOR OPERATING DEPTH-SENSING DEVICE

CROSS-REFERENCE TO RELATED APPLICATIONS

This disclosure is a continuation of International Application No. PCT/CN2020/095719, filed on Jun. 12, 2020, the disclosure of which is hereby incorporated by reference in its entirety.

TECHNICAL FIELD

The present disclosure relates to a sensing system, particularly to a depth-sensing device and a related electronic device and method for operating a depth-sensing device.

BACKGROUND

The time-of-flight (TOF) distance measuring technique calculates the time-of-flight of light signals from a transmitter to a receiver by continuously sending light signals from the transmitter to the target and receiving the light signals back from the target at the receiver, thereby obtaining the distance between a target and a transmitter/receiver. In order to improve the resolution and collect the depth information of the target at a longer distance, the TOF distance measuring technique uses a uniform plane light source as the irradiation source so that each pixel in the pixel array can receive the light signal from the target. Generally, to reduce the delay time, one can only choose to either increase the operating frequency or reduce the resolution. Increasing the operating frequency also increases the power consumption and reduces the battery life; decreasing the resolution increases the error and misinterpretation of the results, both of which have drawbacks.

Therefore, there is a need in the related art for an innovative time-of-flight imaging solution with high resolution and low power consumption.

SUMMARY OF THE INVENTION

One of the objectives of the present disclosure is to disclose a depth-sensing device and a related electronic device and method for operating the depth-sensing device to address the above-mentioned issue.

One embodiment of the present disclosure discloses a depth-sensing device, including an image sensor, which includes a pixel array, configured to sense a reflected light signal reflected from a target to the pixel array, wherein reflected light signal forms a plurality of light speckles on the pixel array. The pixel array includes a plurality of first-type pixels and a plurality of second-type pixels, wherein the first-type pixels are distributed in a first set of pixel rows of the pixel array, the second-type pixels are distributed in a second set of pixel rows of the pixel array. The pixel rows extend toward a first predetermined direction.

One embodiment of the present disclosure discloses an electronic device, which includes the above-mentioned depth-sensing device.

One embodiment of the present disclosure discloses a method for operating the depth-sensing device, including: controlling a pixel array of an image sensor of the depth-sensing device to sense a reflected light signal reflected from a target to the pixel array, wherein the reflected light signal forms a plurality of light speckles on the pixel array, and the pixel array comprises a plurality of first-type pixels and a plurality of second-type pixels; and obtaining a time-of-flight (TOF) of the reflected light signal based on a plurality of sensing results of the plurality of first-type pixels, and obtaining depth information of the target according to the TOF, and wherein the second-type pixels are not used to calculate the depth information.

The depth-sensing device and related electronic device and method for operating the depth-sensing device disclosed in the present disclosure can decrease power consumption and increase the speed without jeopardizing the accuracy.

DETAILED DESCRIPTION

Figure 1:
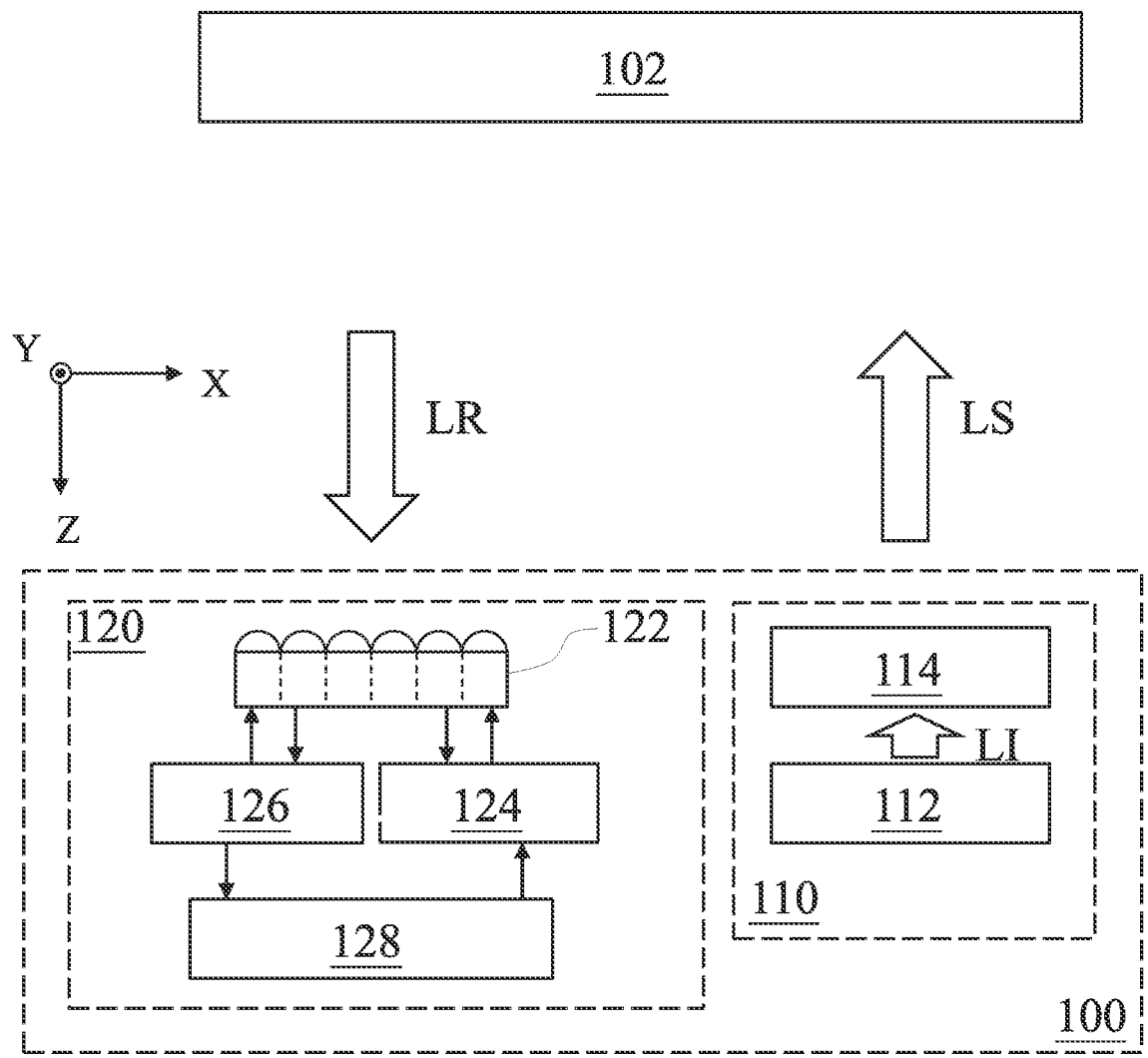
FIG. 1 is a schematic diagram illustrating an imaging system according to embodiments of the present disclosure.

The following disclosure provides many different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for ease of description to discuss one element or feature's relationship to another element(s) or feature(s) as illustrated in the drawings. These spatially relative terms are intended to encompass different orientations of the device in use or operation in addition to the orientation depicted in the drawings. The apparatus may be otherwise oriented (e.g., rotated by 90 degrees or at other orientations), and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "the same" generally means within 10%, 5%, 1%, or 0.5% of a given value or range. Alternatively, the term "the same" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, durations of times, temperatures, operating conditions, ratios of amounts, and the likes) disclosed herein should be understood as modified in all instances by the term "the same." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 is a functional block diagram illustrating an imaging system 100 according to embodiments of the present disclosure. The imaging system 100 can be implemented using a three-dimensional (3D) imaging system, which is configured to obtain depth information (or depth image) of surrounding target(s). For example (however, the present disclosure is not limited thereto), or the imaging system 100 can be a TOF imaging system, which can obtain depth information of a target 102 by measuring the distance between the target 102 and the imaging system 100. It should be noted that, in certain embodiments, the imaging system 100 could be a 3D imaging system, which can determine the depth information of the target 102 according to the change in the patterns of reflected light signals received by the receiving terminal. For the sake of brevity, the following embodiment is directed to the imaging system 100 implemented using a TOF imaging system to discuss the imaging solution of the present disclosure. However, persons having ordinary skill in the art should appreciate that the present imaging solution may be applied to other 3D imaging systems capable of obtaining the depth image according to light signals of the transmitting terminal and receiving terminal.

The imaging system 100 can include (but is not limited to) a light-emitting unit 110 and an image sensor 120. The light-emitting unit 110 is used to generate a light signal LS, wherein the light signal LS can have a predetermined pattern so that the energy can be concentrated on the predetermined pattern; for example, the predetermined pattern can be a speckle array, wherein the light energy is concentrated on each speckle of the speckle array. The light-emitting unit 110 can include a light source 112 and an optical microstructure 114. The optical microstructure 114 is configured to change the path and irradiation range (and the like) of the light signal LI outputted from the light source 112 so as to generate the light signal LS having the predetermined pattern. In the present embodiment, the projection of the light signal LS on the target 102 forms a plurality of light speckles that are separated from each other to reduce the influence of background noise on the measurement result.

For example (however, the present disclosure is not limited thereto), the optical microstructure 114 can include a diffractive optical element (DOE) or refractive optical element (ROE), configured to conically diffract (or conically refract) the light signal LI to generate the light signal LS such that the projection of the light signal LS onto the target 102 may form a plurality of light speckles separated from each other. In some embodiments, a collimating lens is further included between the light source 112 and the optical microstructure 114 for rectifying the light signal LI to form parallel light.

Figure 2:
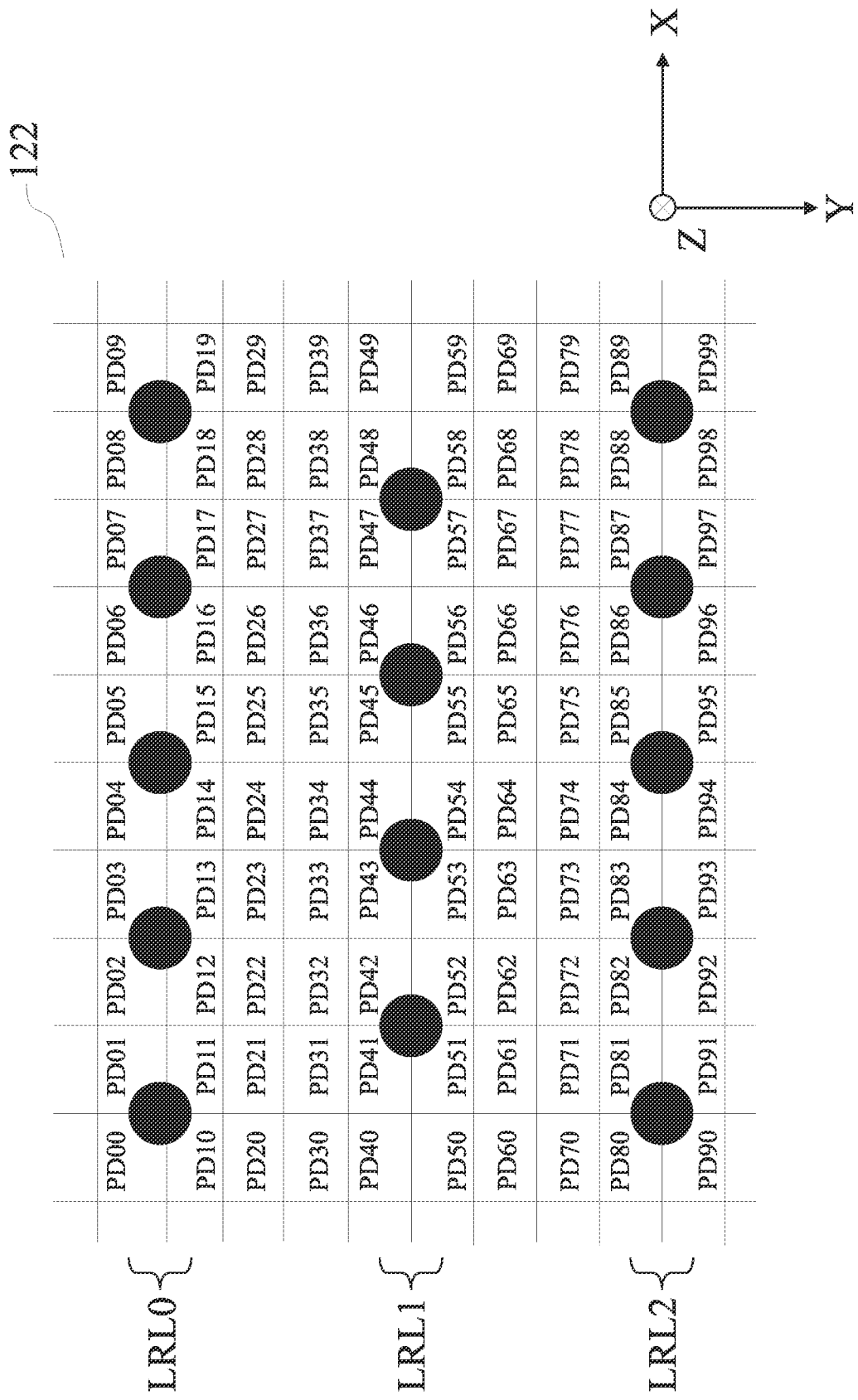
FIG. 2 is a schematic diagram illustrating a plurality of light speckles irradiating on the pixel array according to a first embodiment of the present disclosure.

The image sensor 120 is configured to sense the reflected light signal LR returned from the target 102 to obtain image information of the target 102, wherein reflected light signal LR is generated by the light signal LS reflected from the target 102. In the present embodiment, the image sensor 120 includes (but is not limited to) a pixel array 122, a light speckle position determination unit 126, a depth information calculation unit 124, and a storage 128. Reference is also made to FIG. 2, in which the pixel array 122 has a plurality of pixel rows extending along a first predetermined direction X and a plurality of pixel columns extending along a second predetermined direction Y; for example, the first pixel row consists of the pixel PD00 to the pixel PD09, the second pixel row consists of the pixel PD10 to the pixel PD19, the third pixel row consists of the pixel PD20 to the pixel PD29; and the first pixel columns consisting of the pixel PD00 to the pixel PD90, the second pixel columns consisting of the pixel PD01 to the pixel PD91, the third pixel columns consisting of the pixel PD02 to the pixel PD92. In the present embodiment, the first predetermined direction X is perpendicular to the second predetermined direction Y, and the pixel array 122 is configured to sense the reflected light signal LR. It should be noted that the light signal LS can form a plurality of light speckles separated from each other on the surface of the target 102, and the plurality of light speckles are reflected onto the pixel array 122 and form a plurality of light speckles separated from each other on the pixel array 122, such as the black dots shown in FIG. 2 (in the actual image, they manifest as brighter light speckles, and the black dots in the appended drawings are for illustration purpose only), wherein each light speckle irradiates at least one pixel.

The light speckle position determination unit 126 is coupled to the pixel array 122 and configured to scan the pixel array 122 during a pre-operation stage to establish a database of necessary pixels. Specifically, the pre-operation stage can be a pre-operation phase before the actual use of the imaging system 100. For example, during the pre-operation stage, a completely flat target 102 without concave or convex depth may be used as a reference target to return the reflected light signal LR to the pixel array 122 so that the light speckle position determination unit 126 reads the sensing result of each pixel in each row of the pixel array 122 to detect all the plurality of positions of the plurality of light speckles irradiated on the pixel array 122, i.e., to detect all the pixels irradiated in whole or in part by the plurality of light speckles. Then, the plurality of pixels in the pixel array are classified into a plurality of first-type pixels and a plurality of second-type pixels based on the plurality of locations.

During the normal operation stage after the pre-operation stage, the plurality of second-type pixels in the pixel array 122 can be disabled, and only the plurality of first-type pixels are enabled. The depth information calculation unit 124 only uses the plurality of first-type pixels to calculate the depth information and ignores the plurality of second-type pixels so as to save power consumption and time. In certain embodiments, it is feasible to leave the plurality of second-type pixels in the pixel array 122 conducted, and the depth information calculation unit 124 can simply ignore (does not read) the data outputted from the plurality of second-type pixels.

The light speckle position determination unit 126 can store position information of the plurality of first-type pixels of the pixel array 122 in the storage 128, and during the normal operation stage, the depth information calculation unit 124 reads the storage 128 to obtain position information of the plurality of first-type pixels so as to read a plurality of sensing results of the plurality of first-type pixels in the pixel array 122. During the normal operation stage (i.e., when the imaging system 100 is actually in use), the target 102 is often non-planar but an actual object to be detected that has an uneven appearance. The depth information calculation unit 124 detects the TOF of the reflected light signal LR based on the plurality of sensing results of the plurality of first-type pixels that are read, and then obtain the depth information of the target 102 according to the TOF. For example, the depth information calculation unit 124 can obtain the depth information (depth image) of the regions irradiated by the plurality of light speckles from the light signal LS on the surface of the target 102 according to the pixel output generated by the pixels irradiated by the plurality of light speckles.

The light speckle position determination unit 126 takes at least a plurality of pixels on the pixel array 122 that are irradiated by the plurality of light speckles as the first-type pixel. In the present embodiment, the light-emitting unit 110 is arranged at one side of the pixel array 122 along the first predetermined direction X, and the two are arranged side by side, and a virtual line connecting the center of the light-emitting unit 110 and the center of the pixel array 122 is parallel to the first predetermined direction X, and hence during the normal operation stage, the concave and convex of the surface of the target 102 only result in changes in the position of the light speckle on the pixel array 122 along the first predetermined direction X. That is, in an ideal condition (i.e., without considering the mechanical errors when manufacturing the imaging system 100 and the distortion of the light speckle pattern resulted from the optical errors), as long as a pixel of any row in the pixel array 122 is irradiated by the light speckle during the pre-operation stage, the light speckle may also irradiate any other pixel in the same row during the normal operation stage; whereas if none of the pixels of a particular row in the pixel array 122 is irradiated by the light speckle during the pre-operation stage, any pixel of that row will still not be irradiated by the light speckle during the normal operation stage, either. In this way, in the present embodiment, the light speckle position determination unit 126 takes all pixels in the plurality of pixel rows having the plurality of pixels that are irradiated by the plurality of light speckles on the pixel array 122 as the first-type pixels and takes the remaining pixels as the second-type pixels.

The generation of the plurality of light speckles as shown in FIG. 2 can be implemented using the light source 112 in connection with the optical microstructure 114. In one example, the light speckles that are generated have a plurality of light speckle rows LRL0, LRL1, and LRL2 extending along the first predetermined direction X, wherein the plurality of light speckle rows LRL0, LRL1 and LRL2 are equally spaced, and the plurality of light speckles in each light speckle row LRL0, LRL1 and LRL2 are arranged following specific rules. Specifically, the plurality of light speckles in each light speckle row LRL0, LRL1 are equally spaced, and the plurality of light speckles in two adjacent light speckle rows are arranged in a staggered manner; for example, the plurality of light speckles in the light speckle row LRL0 and the plurality of light speckles in the light speckle row LRL1 are staggered with each other; the plurality of light speckles in the light speckle row LRL1 and the plurality of light speckles in the light speckle row LRL2 are staggered with each other. Since the first pixel row (the pixel PD00 to the pixel PD09), the second pixel row (the pixel PD10 to the pixel PD19), the fifth pixel row (the pixel PD40 to the pixel PD49), the sixth pixel row (the pixel PD50 to the pixel PD59), the ninth pixel row (the pixel PD80 to the pixel PD89) and the tenth pixel row (the pixel PD90 to the pixel PD99) in FIG. 2 all have pixels that are irradiated by the plurality of light speckles, all pixels in the first pixel row (the pixel PD00 to the pixel PD09), the second pixel row (the pixel PD10 to the pixel PD19), the fifth pixel row (the pixel PD40 to the pixel PD49), the sixth pixel row (the pixel PD50 to the pixel PD59), the ninth pixel row (the pixel PD80 to the pixel PD89) and the tenth pixel row (the pixel PD90 to the pixel PD99) are determined as the first-type pixels, and the other pixels on the pixel array 122 are determined as the second-type pixels.

Figure 3:
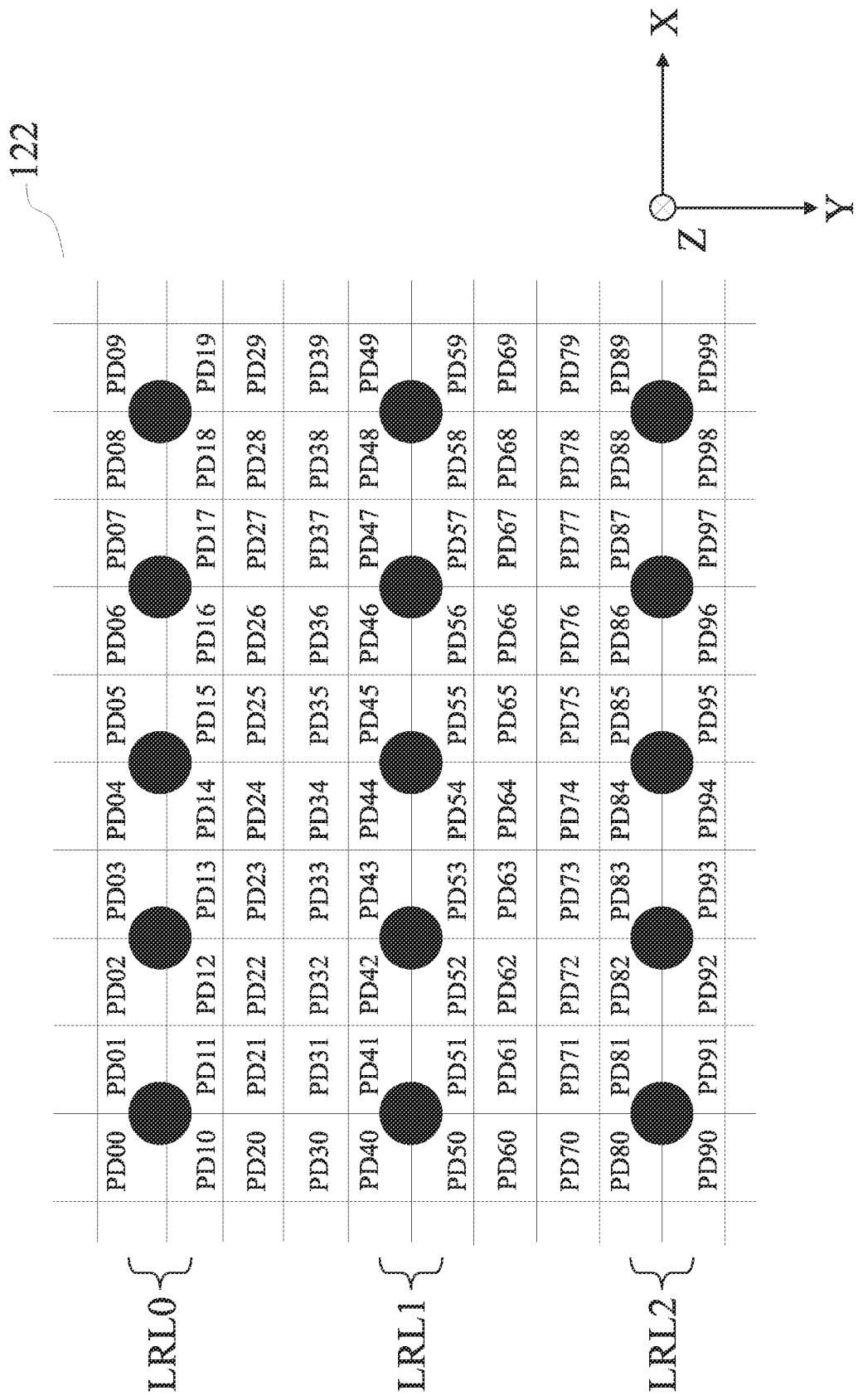
FIG. 3 is a schematic diagram illustrating a plurality of light speckles irradiating on the pixel array according to a second embodiment of the present disclosure.

The generation of the plurality of light speckles as shown in FIG. 3 can be implemented using the light source 112 in connection with the optical microstructure 114. In one example, the light speckles that are generated have a plurality of light speckle rows LRL0, LRL1, and LRL2 extending along the first predetermined direction X, wherein the plurality of light speckle rows LRL0, LRL1, and LRL2 are equally spaced, and the plurality of light speckles in each light speckle row LRL0, LRL1, and LRL2 are arranged following specific rules. Specifically, the plurality of light speckles in each light speckle row LRL0, LRL1, and LRL2 are equally spaced, and the plurality of light speckles in two adjacent light speckle rows are arranged in an in-line manner; for example, the plurality of light speckles in the light speckle row LRL0 and the plurality of light speckles in the light speckle row LRL1 are aligned with each other; the plurality of light speckles in the light speckle row LRL1 and the plurality of light speckles in the light speckle row LRL2 are aligned with each other. Since the first pixel row (the pixel PD00 to the pixel PD09), the second pixel row (the pixel PD10 to the pixel PD19), the fifth pixel row (the pixel PD40 to the pixel PD49), the sixth pixel row (the pixel PD50 to the pixel PD59), the ninth pixel row (the pixel PD80 to the pixel PD89) and the tenth pixel row (the pixel PD90 to the pixel PD99) in FIG. 3 all have pixels that are irradiated by the plurality of light speckles, all pixels in the first pixel row (the pixel PD00 to the pixel PD09), the second pixel row (the pixel PD10 to the pixel PD19), the fifth pixel row (the pixel PD40 to the pixel PD49), the sixth pixel row (the pixel PD50 to the pixel PD59), the ninth pixel row (the pixel PD80 to the pixel PD89) and the tenth pixel row (the pixel PD90 to the pixel PD99) are determined as the first-type pixels, and the other pixels on the pixel array 122 are determined as the second-type pixels.

Figure 4:
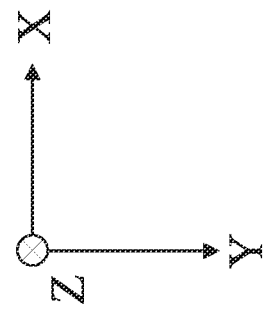
FIG. 4 is a schematic diagram illustrating a plurality of light speckles irradiating on the pixel array according to a third embodiment of the present disclosure.

The generation of the plurality of light speckles as shown in FIG. 4 can be implemented using the light source 112 in connection with the optical microstructure 114. In one example, the light speckles that are generated have a plurality of light speckle rows LRL0, LRL1 and LRL2 extending along the first predetermined direction X, wherein the plurality of light speckle rows LRL0, LRL1 and LRL2 are equally spaced, and the plurality of light speckles in each light speckle row LRL0, LRL1 and LRL2 are pseudo-randomly spaced. Since the first pixel row (the pixel PD00 to the pixel PD09), the second pixel row (the pixel PD10 to the pixel PD19), the fifth pixel row (the pixel PD40 to the pixel PD49), the sixth pixel row (the pixel PD50 to the pixel PD59), the ninth pixel row (the pixel PD80 to the pixel PD89) and the tenth pixel row (the pixel PD90 to the pixel PD99) in FIG. 4 all have pixels that are irradiated by the plurality of light speckles, all pixels in the first pixel row (the pixel PD00 to the pixel PD09), the second pixel row (the pixel PD10 to the pixel PD19), the fifth pixel row (the pixel PD40 to the pixel PD49), the sixth pixel row (the pixel PD50 to the pixel PD59), the ninth pixel row (the pixel PD80 to the pixel PD89) and the tenth pixel row (the pixel PD90 to the pixel PD99) are determined as the first-type pixels, and the other pixels on the pixel array 122 are determined as the second-type pixels.

In certain embodiments, by adjusting the design, the light speckle position determination unit 126 can only take a plurality of pixels on the pixel array 122 that are irradiated by the plurality of light speckles as the first-type pixels and take the other pixels as the second-type pixels. In certain embodiments, the light speckle position determination unit 126 can also take a plurality of pixel rows where a plurality of pixels of the pixel array 112 are irradiated by the plurality of light speckles reside as the first-type pixels and takes all other pixels as the second-type pixels.

By using the light speckle position determination unit 126 to screen (in advance in the pre-operation stage) pixels that are necessary to be read by the depth information calculation unit 124 during the normal operation stage, it is feasible to speed up the process that the depth information calculation unit 124 reads the sensing result and calculates depth information, and also saves power consumption. Take the embodiments shown in FIG. 2 to FIG. 4 as an example; one-half of the pixel rows are not read. As discussed above, in certain embodiments, the pixels that are not required to be read can be disabled; that is, in embodiments shown in FIG. 2 to FIG. 4, one-half of the pixel rows can be kept disabled without performing the sensing task.

It should be noted that the light speckle positions shown in embodiments of FIG. 2 to FIG. 4 are ideal results, and in reality, distortions may occur due to the imperfection of the light-emitting unit 110, so that the plurality of light speckles that should have irradiated the same pixel row in an ideal would irradiate pixels in more than one rows as a result of distortion, thereby causing more pixel rows to be taken as the first-type pixels so that the number of pixel rows can be ignored reduces, thereby affecting the extent that the power consumption can be reduced and slowing down the read speed. Hence, in certain embodiments, the light-emitting unit 110 can further include a calibration means to calibrate the shift of the light speckle. Specifically, during the pre-operation stage, the light-emitting unit 110 of the imaging system 100 is first subjected to the mechanical calibration and optical calibration before the plurality of pixels in the pixel array 122 are classified as the plurality of the first-type pixels and the plurality of the second-type pixels. In certain embodiments, the mechanical calibration can include testing the light-emitting unit 110 and establishing an optical offset model of the light-emitting unit 110 so as to calibrate the light-emitting unit 110 accordingly, which includes adjusting the relative positions or angles of the light-emitting unit 110 and the pixel array 122. In certain embodiments, the optical calibration can include controlling the light-emitting unit 110 to transmit the light signal LS and performing the keystone adjustment to the light-emitting unit 110 accordingly (e.g., adjusting the position or angle of the light source 112).

Figure 5:
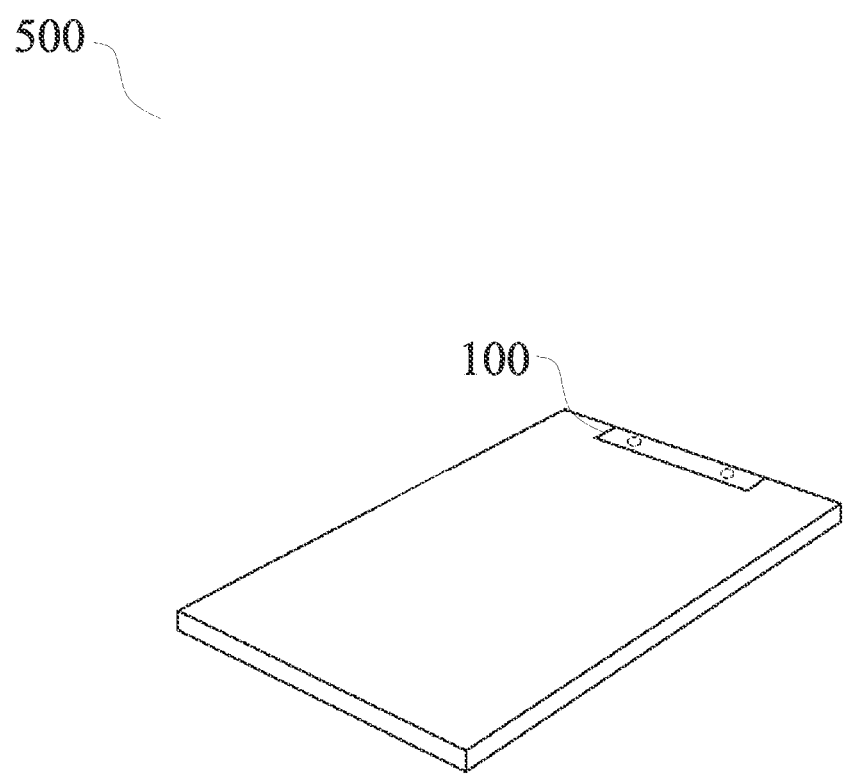
FIG. 5 is a schematic diagram illustrating an electronic device according to embodiments of the present disclosure.

FIG. 5 is a schematic diagram illustrating an electronic device 500 employing the imaging system 100 according to embodiments of the present disclosure. In certain embodiments, the electronic device 500 can be, for example, a smartphone, personal digital assistant, hand-held computing system, or tablet PC, or the like.

All or some of the steps of said pre-operational phase may be performed as a pre-operational method of the imaging system 100 and may be performed before the imaging system 100 is shipped from the factory or by the user after it is shipped from the factory. For example, when the electronic device 500 is impacted, and the positions of the pixel array 122 and the light-emitting unit 110 in the imaging system 100 are shifted, and the user therefore finds that the imaging system 100 is less accurate during the normal operational stage, then the user can perform the pre-operation stage by himself through the system options or programs preset by the electronic device 500 following the operating instructions provided to re-evaluate which pixels in the pixel array 122 belongs to the plurality of first-type pixels, in order to improve the accuracy of the normal operation stage.

The foregoing outlines features of several embodiments of the present disclosure so that persons having ordinary skill in the art may better understand the various aspects of the present disclosure. Persons having ordinary skill in the art should appreciate that they may readily use the present disclosure as a basis for designing or modifying other processes and structures for carrying out the same purposes and/or achieving the same advantages of the embodiments introduced herein. Persons having ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A depth-sensing device, comprising:
    an image sensor, comprising a pixel array, configured to sense a reflected light signal reflected from a target to the pixel array, wherein the reflected light signal forms a plurality of light speckles on the pixel array, and the pixel array comprises a plurality of first-type pixels and a plurality of second-type pixels, wherein the first-type pixels are distributed in a first set of pixel rows of the pixel array, the second-type pixels are distributed in a second set of pixel rows of the pixel array, the first set of pixel rows do not overlap with the second set of pixel rows, and the pixel rows extend toward a first predetermined direction;
    a depth information calculation unit, configured to obtain a time-of-flight (TOF) of the reflected light signal based on a plurality of sensing results of the plurality of first-type pixels, and obtain depth information of the target according to the TOF, and wherein the second-type pixels are not used to calculate the depth information; and
    a storage, configured to store position information of the plurality of first-type pixels;
    wherein the plurality of light speckles have a plurality of light speckle rows extending along the first predetermined direction, the plurality of light speckle rows are equally spaced, and the plurality of light speckles in each of the light speckle rows are pseudo-randomly spaced.

2. The depth-sensing device of claim 1, wherein the depth information calculation unit reads the plurality of sensing results of the plurality of first-type pixels based on the position information of the plurality of first-type pixels.

3. The depth-sensing device of claim 2, wherein the image sensor further comprises a light speckle position determination unit, configured to detect a plurality of positions of the plurality of light speckles on the pixel array based on the sensing result of each pixel in the pixel array, and classify a plurality of pixels in the pixel array into the plurality of first-type pixels and the plurality of second-type pixels based on the plurality of positions; and the light speckle position determination unit stores the position information of the plurality of first-type pixels in the pixel array to the storage during a pre-operation stage.

4. The depth-sensing device of claim 3, wherein each light speckle irradiates a plurality of pixels on the pixel array.

5. The depth-sensing device of claim 4, wherein the light speckle position determination unit takes at least the plurality of pixels on the pixel array that are irradiated by the plurality of light speckles as the first-type pixels.

6. The depth-sensing device of claim 3, wherein the target of the pre-operation stage is a planar object.

7. The depth-sensing device of claim 3, wherein the light speckle position determination unit takes the plurality of pixel rows where the plurality of pixels of the pixel array irradiated by the plurality of light speckles reside as the first set of pixel rows, and takes all pixels in the first set of pixel rows as the first-type pixels, and takes all the other pixel row as the second set of pixel rows, and takes all pixels in the second set of pixel rows as the second-type pixels, so that the first-type pixels distribute continuously in the first set of pixel rows, and the second-type pixel distribute continuously in the second set of pixel rows.

8. The depth-sensing device of claim 1, wherein the plurality of second-type pixels in the pixel array are disabled during a normal operation stage so that the plurality of second-type pixels does not perform sensing.

9. An electronic device, comprising: a light-emitting unit, configured to emit a light signal to a target to generate a reflected light signal; and
a depth-sensing device, comprising:
an image sensor, comprising a pixel array, configured to sense the reflected light signal reflected from the target to the pixel array, wherein the reflected light signal forms a plurality of light speckles on the pixel array, and the pixel array comprises a plurality of first-type pixels and a plurality of second-type pixels, wherein the first-type pixels are distributed in a first set of pixel rows of the pixel array, the second-type pixels are distributed in a second set of pixel rows of the pixel array, the first set of pixel rows do not overlap with the second set of pixel rows, and the pixel rows extend toward a first predetermined direction;
a depth information calculation unit, configured to obtain a time-of-flight (TOF) of the reflected light signal based on a plurality of sensing results of the plurality of first-type pixels, and obtain depth information of the target according to the TOF, and wherein the second-type pixels are not used to calculate the depth information; and
a storage, configured to store position information of the plurality of first-type pixels;
wherein the plurality of light speckles have a plurality of light speckle rows extending along the first predetermined direction, the plurality of light speckle rows are equally spaced, and the plurality of light speckles in each of the light speckle rows are pseudo-randomly spaced.

10. The electronic device of claim 9, wherein the light-emitting unit is arranged at one side of the pixel array along the first predetermined direction, and a virtual line connecting a center of the light-emitting unit and a center of the pixel array is parallel to the first predetermined direction.

11. The electronic device of claim 10, wherein the light-emitting unit comprises:
a light source, configured to output a light signal; and
an optical microstructure, configured to change a path of the light signal to generate the light signal.

12. The electronic device of claim 9, wherein the plurality of second-type pixels in the pixel array are disabled during a normal operation stage so that the plurality of second-type pixels does not perform sensing.

13. A method for operating a depth-sensing device, comprising:
controlling a pixel array of an image sensor of the depth-sensing device to sense a reflected light signal reflected from a target to the pixel array, wherein the reflected light signal forms a plurality of light speckles on the pixel array, and the pixel array comprises a plurality of first-type pixels and a plurality of second-type pixels; and
obtaining a time-of-flight (TOF) of the reflected light signal based on a plurality of sensing results of the plurality of first-type pixels and obtaining depth information of the target according to the TOF, wherein the first set of pixel rows do not overlap with the second set of pixel rows, and the second-type pixels are not used to calculate the depth information;
wherein the plurality of light speckles have a plurality of light speckle rows extending along the first predetermined direction, the plurality of light speckle rows are equally spaced, and the plurality of light speckles in each of the light speckle rows are pseudo-randomly spaced.

14. The method of claim 13, further comprising:
detecting a plurality of positions of the plurality of light speckles on the pixel array based on the sensing result of each pixel in the pixel array, and classifying the plurality of pixels in the pixel array into the plurality of first-type pixels and the plurality of second-type pixels based on the plurality of positions; and
storing the position information of the plurality of first-type pixels.

15. The method of claim 13, further comprising:
performing a mechanical calibration and an optical calibration to the light-emitting unit, wherein the step of performing the mechanical calibration to the light-emitting unit comprises:
establishing an optical offset model of the light-emitting unit, and adjusting a position of the light-emitting unit accordingly; and
the step of performing the optical calibration to the light-emitting unit comprises:
controlling the light-emitting unit to transmit the light signal and performing a keystone adjustment to the light-emitting unit accordingly.

* * * * *